United States Patent Office 3,718,471
Patented Feb. 27, 1973

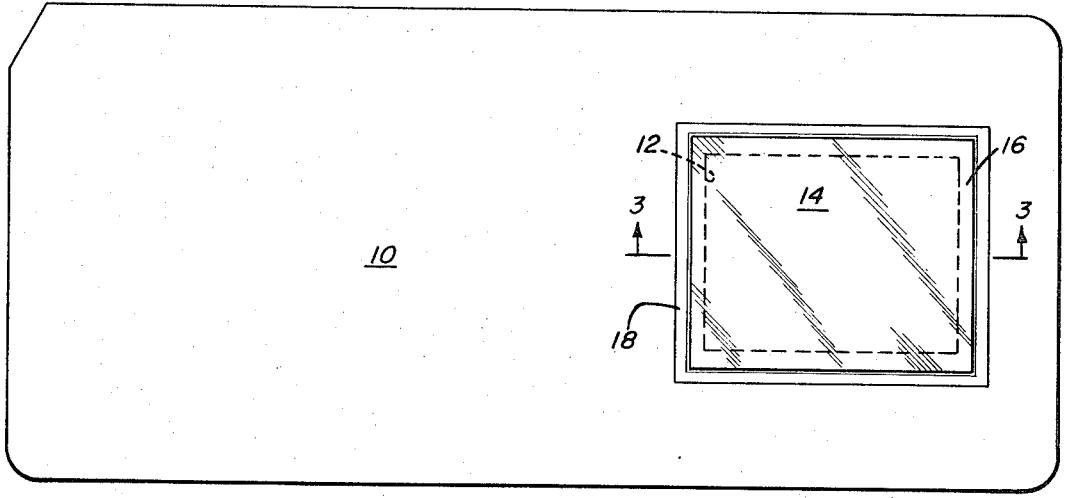
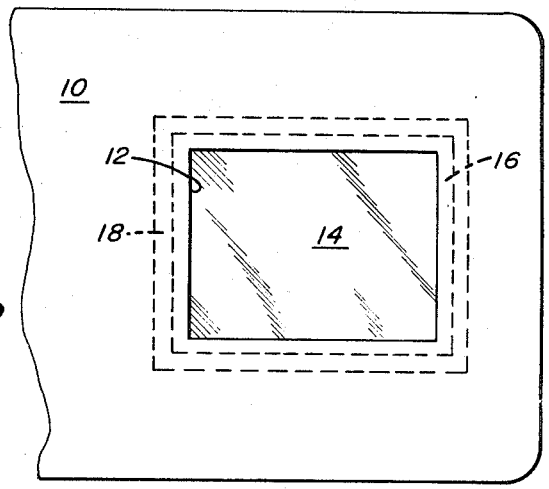
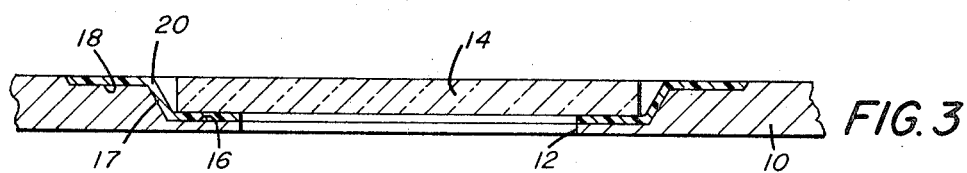
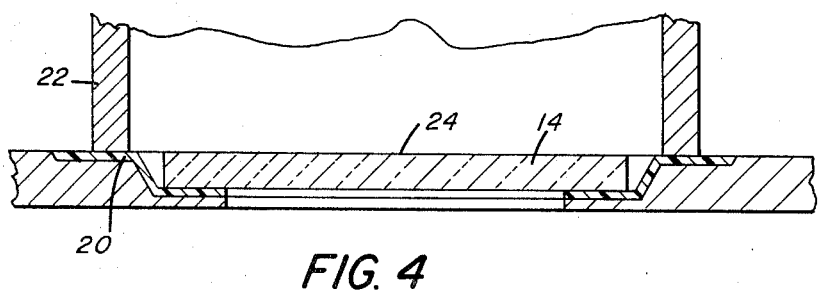

3,718,471
FILM RECORD CARD
Evan A. Edwards, Pittsford, and Frederick F. Tone, Holley, N.Y., assignors to Eastman Kodak Company, Rochester, N.Y.
Filed Aug. 3, 1970, Ser. No. 60,491
Int. Cl. G03c 1/52, 1/64, 1/66
U.S. Cl. 96—75
14 Claims

ABSTRACT OF THE DISCLOSURE

A film record card having an aperture therein and a photographic film secured over the aperture wherein the card has an area in one face thereof recessed about the aperture to a depth at least as great as the thickness of the film, the film having dimensions greater than the aperture and less than the recessed area. A second recessed area is formed in the same face of the card and extends about the periphery of the first recessed area, the second recessed area having a depth substantially less than the thickness of the film. A thin layer of a fluid-impermeable material, such as a thermoplastic film, is coated on the recessed areas and acts to protect the card from the adverse effects of photographic processing solutions as well as acting to secure the photographic film over the aperture.

BACKGROUND OF THE INVENTION

The present invention is directed to record cards which are used in card-controlled tabulating machines, information retrieval systems and the like, and more particularly, it relates to record cards of the type wherein a paper body is laminated with photographic film or paper, stencil tissue or some other laminar material, such cards being generally referred to as "aperture cards" from the fact that the paper body of the card usually contains an aperture through which a record-bearing portion of the laminar material may be viewed. More specifically, the present invention is useful in record cards having a frame of microfilm secured over the aperture in the card, whereby each card may contain a picture record of the data encoded on the card. The film or other inserts mounted in said cards may be conveniently classified and sorted mechanically as to subject matter in a manner understood in the art, as well as viewed, examined, indexed, and filed.

Heretofore, aperture cards have been manufactured by providing a standard tabulating card with an aperture and means for holding the film therein. Generally the card has been supplied to the customer with a blank aperture or with a cover sheet filling the aperture. The customer then prepared the microfilm to be mounted in the aperture, processed the entire reel of microfilm, and then cut the individual frames therefrom and mounted them in the pre-apertured tabulating card, after having removed the cover sheet, if necessary. Various forms of apparatus have been developed and utilized to mount the film frames in the aperture cards, ranging from simple, nearly manual insertion of the film in the aperture card, to sophisticated, automatic equipment for inserting the film.

However, it has been found that many users of such aperture cards find it undersirable to mount film pieces in the aperture card in the foregoing manner. It is often undesirable to separate the microfilm copy of the information from the original data, as is necessary in processing the microfilm in reel form, before the individual frame of microfilm is mounted in the aperture card and the requisite tabulating information is encoded onto the card. As a result, apparatus has been developed which utilizes aperture cards containing the unexposed film already mounted in the aperture. This apparatus is arranged to expose the film, develop the image thereon and dispense the finished card for encoding purposes while the original document is still at hand. As a result, it has become necessary to provide large quantities of aperture cards containing the unexposed film for utilization in such apparatus.

Various card formats and means of retaining film in the aperture have been devised. Some cards utilize a thin film frame or carrier sheet which is attached at the outer edge to the card at the periphery of the aperture and at the inner edge to the periphery of the film. Other cards have utilized a shoulder formed by skiving the edge of the aperture to provide a section of card substantially thinner than the normal thickness thereof and to which the film may be attached. It has been found that the skived aperture card is more economical to produce than the carrier sheet card; however, the carrier sheet aperture card has certain performance advantages over the skived aperture card. The carrier sheet card contains no ground fibrous surface which has been found to be a source of dirt that can obscure the microfilm image or collect in the optics of the card viewer. Moreover, the carrier sheet card permits processing the film while mounted in the card without harming the water-damageable fibrous cardstock from which most aperture cards are formed. This is possible because the carrier sheet provides an area to which a processing head can be sealed to process the entire film surface while preventing contact of the processing solution with the surface of the card.

Because of the expense of the carrier sheet mount, attempts have been made to process film mounted in skived aperture cards. These attempts have been somewhat successful, but are still less than completely satisfactory. One such processing method utilizes a processing head that engages the outer periphery of the film in the skived aperture to prevent the processing solutions from coming into contact with the cardstock. While this method solves the problem of damaging the aperture card with film processing solutions, it has created additional problems affecting the acceptance of the system. The processing head must contact the emulsion surface of the film which is soft and easily damaged, especially before processing. As a result, the processing head seal may adhere to the emulsion and upon removal pull a small piece of emulsion with it. Upon processing the next aperture card film, the emulsion picked up previously by the seal surface may prevent complete sealing with the new film whereby the card surface can be exposed to the harmful effects of the processing solutions. It has also been found that such adherence between the emulsion and the processing head seal can result in significant portions of the emulsion being peeled from the film support, wasting the entire aperture card and reducing the production rates possible. Furthermore, it has been found that such an arrangement leaves a border of unprocessed emulsion about the periphery of the film which, because it has not been processed, has a significantly softer surface than that of a processed emulsion. This unprocessed border has been found to provide dirt problems in subsequent viewing of the film due to the fact that the unprocessed emulsion can flake off during handling and can obscure the image on the remainder of the film and can foul the optics of the aperture card reader. Still further, there is a possibility that the unprocessed emulsion border can retain chemicals that deleteriously affect the archival qualities of the image.

It will thus be appreciated that an aperture card having a cost substantially equal to skived aperture cards and less than carrier sheet aperture cards, while having the performance advantages equal to or better than carrier sheet aperture cards would be extremely desirable and would provide the card user with a number of economic and performance advantages.

SUMMARY OF THE INVENTION

Accordingly, the present invention provides a film record card having an aperture therein and a photographic film secured over the aperture wherein the card is made of a fibrous cardstock and has an area in one face thereof recessed about the aperture to a depth at least as great as the thickness of the film, the film having dimensions greater than the aperture and less than the recessed area. A second recessed area is formed in the same face of the card and extends about the periphery of the first recessed area, the second recessed area having a depth substantially less than the thickness of the film. A thin layer of a fluid-impermeable material, such as a thermoplastic film, is coated on the recessed areas and acts to protect the card from the adverse effects of photographic processing solutions as well as acting to secure the photographic film over the aperture.

The various features of novelty which characterize the present invention are point out with particularity in the claims annexed to and forming a part of this specification. For a better understanding of the inventon, its operating advantages and the specific objects obtained by its use, reference should be had to the accompanying drawings and descriptive matter in which a preferred embodiment of the present invention is illustrated and described.

BRIEF DESCRIPTION OF THE DRAWINGS

FIG. 1 is a plan view of the front surface of a film record card according to a preferred embodiment of the present invention;

FIG. 2 is a plan view of a portion of the rear side of the film record card illustrated in FIG. 1;

FIG. 3 is a greatly enlarged cross-sectional view through the aperture area taken along the line 3—3 of FIG. 1; and FIG. 4 is a cross-sectional view similar to FIG. 3 illustrating a method of processing the film of the record card of the present invention.

DESCRIPTION OF A PREFERRED EMBODIMENT

The film record card, or aperture card, incorporating the present invention is illustrated in FIGS. 1, 2 and 3, and comprises a tabulating card 10 of a configuration well known in the art and generally formed of a fibrous, paper-like, cardstock. An aperture 12 is formed through the card at one end thereof in a position substantially similar to aperture cards of the prior art. A film chip 14, having dimensions greater than the dimensions of the aperture 12, is disposed therein and is secured to the card in a manner to be described more completely hereinbelow. The card is provided with an area 16 in one face thereof recessed about the aperture 12 to a depth at least as great as the thickness of the film 14, see FIG. 3. This recess 16 is formed with outer dimensions greater than the outer dimensions of the film 14. A second recessed area 18 is formed in the same face of the card and extends about and is contiguous with the periphery of the first recessed area 16. This second recessed area 18 has a depth substantially less than the thickness of the film 14 and outer dimensions substantially larger than the dimensions of the film, e.g. ¼ inch greater on each side. In the preferred embodiment of the present record card arrangement, the recessed areas 16 and 18 are preferably formed in the card by grinding or skiving, the method and apparatus for such skiving being disclosed in copending application Ser. No. 60,490, filed simultaneously herewith and entitled "Method and Apparatus For Manufacturing Aperture Cards."

A thin layer 20 of a fluid-impermeable material, such as a thermoplastic film, is coated or printed on substantially the entire surface of the recessed areas 16 and 18 and the transitional shoulder 17 therebetween. This layer protects the fibrous card material from the adverse effects of being exposed to photographic processing solutions while at the same time securing the film 14 in the recessed area 16 over the aperture 12. The layer of fluid-impermeable material has a thickness substantially equal to, or just less than, the depth of recessed area 18 whereby no portion of the top surface of the layer extends above the normal surface of the card. While the layer 20 of the fluid-impermeable material is illustrated as comprising a single layer having a single thckness, it will be appreciated that performance requirements may necessitate the use of a layer which is thicker in one recessed area than it is in the other, or be formed of different materials in the two areas. Moreover, the layer, or layers, may be printed or coated in a single operation or may be coated as a plurality of layers.

In a preferred embodiment of the present record card arrangement, the card is formed of a fibrous paperstock material having a thickness of approximately 0.007 inch. The recessed area 16 about the aperture has a depth of approximately 0.004 inch and dimensions just larger than those of the film 14. The area 18 about the outer periphery of area 16 is recessed to a depth of approximately 0.002 inch and has outer dimensions greater than those of area 16 by approximately ¼ inch on a side. The layer of thermoplastic material 20, preferably polyethylene, has a thickness of 0.002 inch and is coated or printed in the recessed area preferably in a heated, molten state. The film 14 has a thickness between approximately 0.002 inch and 0.003 inch and is secured over the aperture by heat sealing to the thermoplastic layer 20 in recessed area 16.

As will be seen by referring to FIG. 4, the present invention provides a record card containing an unexposed piece of film which may be used in appropriate equipment to receive an image, such as a microfilm image of a document to be copied, and can be processed without removing the piece of film from the card and without damaging the card. A processing head, including a peripheral sealing member 22, can be brought into contact with the fluid-impermeable layer 20 which is coated in the outer recessed area 18, whereby the photographic processing solutions can be applied to the entire emulsion bearing surface 24 of the film 14 without contacting the surface of the card. Thus, the entire emulsion surface of the film is processed and hardened so that no unprocessed, unhardened border of emulsion remains which can adversely affect the future use and legibility of the film image.

While in the preferred embodiment the layer of fluid-impermeable material is a thermoplastic film which both protects the card material from the adverse effects of the photographic processing solution and functions as a thermoplastic adhesive to secure the film over the aperture, other material can be satisfactorily utilized. For example, a thin layer of a fluid-impermeable lacquer or a thermosetting plastic can be first coated into the recessed areas of the card about the aperture to form the requisite protection against the processing solutions, and a layer of an adhesive can be coated over the layer of fluid-impermeable material in the first recessed area 16 to secure the film over the aperture. Alternatively, the layer of adhesive can be applied to the periphery of the film.

Still further, it will be apparent that the record card of the present invention can be manufactured with silver halide photographic film or with diazo film over the aperture, as well as any other exposed or unexposed record bearing surface that might be desired.

Accordingly, it will be seen that the present invention provides a film record card which has the operating advantages of a carrier sheet card in that it permits processing the entire exposed film mounted therein without permitting the processing solutions to contact the card. At the same time, the present card permits better conrol of the position of the film in the card, in all directions. Still further, the present card has a cost substantially equal to skived cards while assuring that there are no exposed ground surfaces which can generate dirt problems.

The invention has been described in detail with particular reference to preferred embodiments thereof, but it will be understood that variations and modifications can be effected within the spirit and scope of the invention.

We claim:

1. A film record card having an aperture therein and an image-receptive film chip secured over said aperture, said card comprising a flat thin card made of cardstock having a first area in one face of the card recessed about said aperture to a depth at least as great as the thickness of said film chip, said film chip having dimensions greater than said aperture and less than said first recessed area, a second recessed area formed in said face of said card extending about the periphery of the first recessed area and having a depth substantially less than the thickness of said film chip, and a substantially continuous thin layer of a fluid-impermeable material on said first recessed area between said film chip and said cardstock and on said second recessed area.

2. The invention according to claim 1 wherein said layer of fluid-impermeable material is below said face of said card.

3. The invention according to claim 1 wherein said layer of fluid-impermeable material is coated substantially throughout said recessed areas.

4. The invention according to claim 1 wherein said second recessed area is contiguous with said first recessed area.

5. The invention according to claim 1 wherein said fluid-impermeable material is arranged to secure said film in said recessed area.

6. The invention according to claim 1 wherein said film is secured in said recessed area by a layer of adhesive between said film and said layer of fluid-impermeable material.

7. The invention according to claim 1 wherein a layer of adhesive is disposed in said first recessed area over said layer of fluid-impermeable material and arranged to secure said film in said recessed area.

8. The invention according to claim 6 wherein said layer of adhesive is a thermoplastic material.

9. The invention according to claim 1 wherein said fluid-impermeable layer is a thermoplastic film.

10. The invention according to claim 1 wherein said fluid-impermeable layer is a thermosetting film.

11. The invention according to claim 8 wherein said film is secured to said film record card by heat sealing to said thermoplastic layer.

12. The invention according to claim 1 wherein said recessed area has an abraded roughened surface.

13. The invention according to claim 1 wherein said film is an unexposed silver halide photographic film.

14. The invention according to claim 1 wherein said film is an unexposed diazo film.

References Cited

UNITED STATES PATENTS

| | | | |
|---|---|---|---|
| 3,212,412 | 10/1965 | Langan et al. | 93—1 |
| 3,354,568 | 10/1967 | Koschier | 40—158 R |
| 3,352,045 | 10/1967 | Langan | 40—158 R |
| 2,984,921 | 5/1961 | Herzig | 40—158 R |
| 3,289,344 | 11/1966 | Kollar | 40—158 R |
| 3,283,432 | 11/1966 | Kollar et al. | 40—158 R |
| 3,406,477 | 10/1968 | Kollar et al. | 40—158 R |
| 3,274,722 | 9/1966 | Kollar et al. | 40—158 R |

NORMAN G. TORCHIN, Primary Examiner

E. C. KIMLIN, Assistant Examiner

U.S. Cl. X.R.

40—158, 159